United States Patent Office 3,355,786
Patented Dec. 5, 1967

3,355,786
TOOLHOLDERS FOR USE WITH DETACHABLE
CUTTING INSERTS
James Hargreaves, Finham, Coventry, England, assignor
to Wickman Wimet Limited, Coventry, England
Filed June 21, 1965, Ser. No. 465,259
Claims priority, application Great Britain, June 30, 1964,
26,931/64
5 Claims. (Cl. 29—96)

ABSTRACT OF THE DISCLOSURE

A tool holder includes a shank having at one end thereof a recess adapted to receive a cutting insert, the recess defining a shoulder with the remainder of the shank, a first clamping member engageable with an insert positioned in said recess and movable transversely relative to the shank to clamp the insert against the base of said recess, a screw extending through the first clamping member into screw threaded engagement with shank so that rotation of the screw moves the first clamping member transversely relative to the shank, a second clamping member engageable with the insert and movable longitudinally relative to the shank to clamp the insert against said shoulder, and co-operating cam surfaces on the first and second clamping members, movement of the first clamping member transversely relative to the shank to clamp the insert against the base of said recess acting through said cam surfaces to move the second clamping member longitudinally relative to the shank to clamp the insert against said shoulder.

This invention relates to toolholders for use with detachable cutting inserts, and has for its object to provide a construction which is especially useful in copying lathes, where the direction of forces acting on the cutting insert may vary considerably.

A toolholder according to the invention comprises in combination a shank having at one end a recess adapted to receive a cutting insert, the recess defining with the remainder of the shank a shoulder, a clamp movable transversely relative to said shank for gripping an insert in said recess, means for moving the clamp transversely, and means operable upon initial transverse movement of the clamp for forcing the insert against the shoulder, so that the insert is held against both longitudinal and transverse movement relative to the shank.

Figure 1:
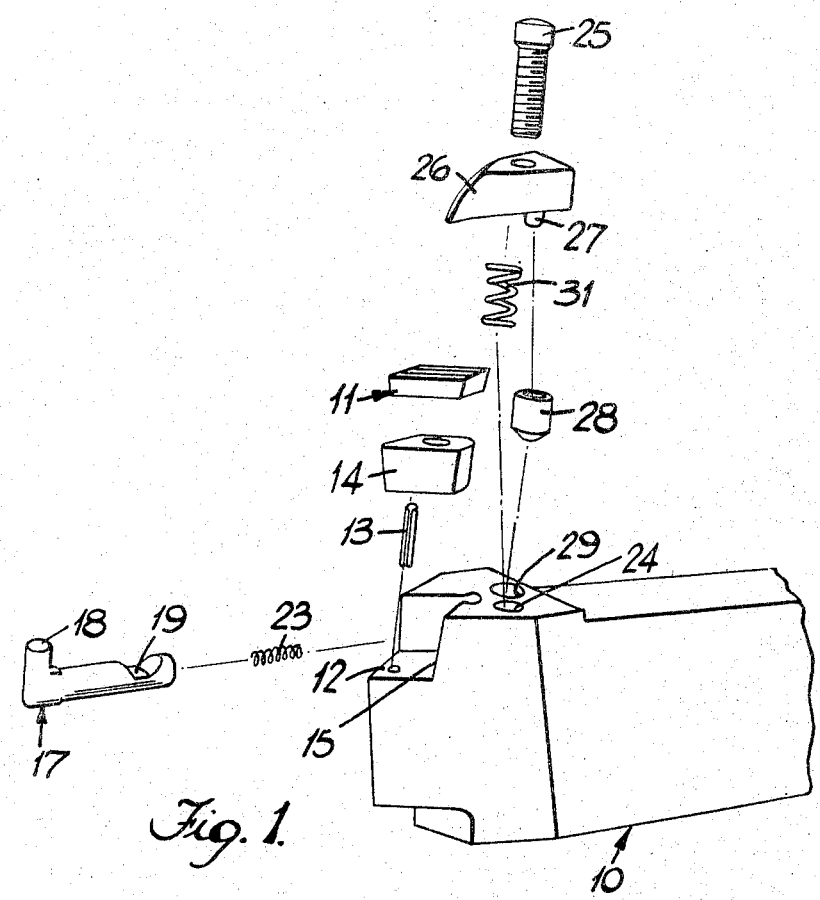
Figure 2:
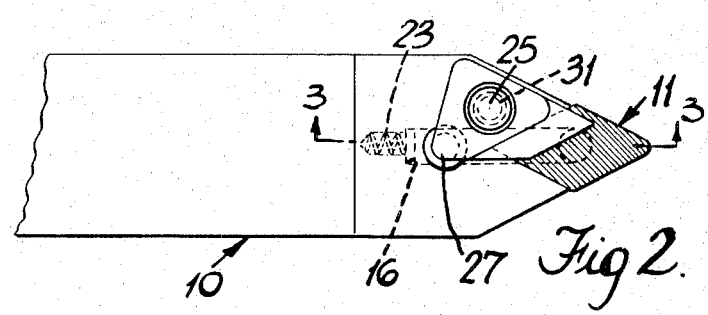
Figure 3:
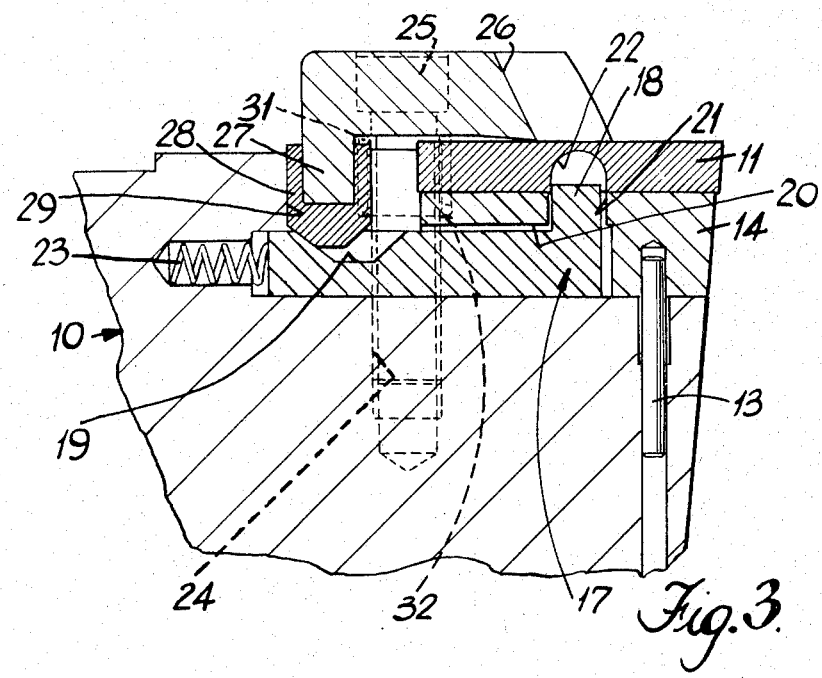

One example of the invention is illustrated in the accompanying drawings wherein FIGURE 1 is an exploded perspective view of a toolholder with its associated cutting insert, FIGURE 2 is a plan view of the assembled tool, and FIGURE 3 is a sectional view on the line 3—3 in FIGURE 2.

Referring to the drawings there is provided a toolholder which is intended for use with cutting inserts of rhomboidal form capable of being used in two alternative positions 180° apart. The toolholder includes a shank 10 formed at one end with a recess 12, the base of which is shaped to receive an anvil 14 on which a cutting insert 11 rests. The anvil 14 is secured in the recess 12 by means of a longitudinally split sleeve 13 which engages with corresponding bores formed in the anvil and the recess. The base of the recess 12, which defines with the remainder of the shank 10, a shoulder 15 shaped complementarily to two adjacent sides of the insert 11 and anvil 14, may be at any angle relative to the shank 10 to give the necessary cutting rake to the insert 11.

Extending longitudinally into the shank 10 from the base of the recess 12 is a passage 16 in which is slidably mounted a plunger 17 which extends from the passage 16 through a groove 20 in the anvil 14, and at its end terminates in an upwardly directed portion 18 extending through a central hole 21 in the anvil 14 into a central hole 22 extending through or, as shown, partway through the insert 11. The plunger 17 is thus engaged with the insert 11 and a spring 23 acting between the plunger 17 and the end of the passage 16 urges the insert 11 away from the shoulder 15.

Extending into the shank at one side of the recess 12 is a screw-threaded bore 24 in which is engaged a bolt 25 holding in position a clamp 26 for forcing the insert 11 into contact with the anvil 14. The clamp 26 has formed integrally therewith a spigot 27 engaged by a bush 28 slidable within a bore 29 parallel with the bolt 25 and intersecting the passage 26. The end of the bush 28 is of truncated conical form and engages a complementary recess 19 in the plunger 17, and the arrangement is such that as the clamp 26 is tightened the first effect is to move the plunger 17 against the spring 23 and so force the insert 11 against the shoulder 15. Thereafter, the insert 11 is engaged by the clamp 26 and so is held tightly against both transverse and longitudinal movement relative to the shank. When the clamp 26 is loosened it is urged away from the insert 11 by the action of a spring 31 acting between the clamp 26 and a step 32 formed in the bore 24. It will be appreciated that the arrangement enables an operator to clamp the insert 11 against the shoulder 15 and the base of the recess 12 in a single operation.

The insert 11 is formed as shown with a pair of chip grooves which take part in the cutting action in the two positions of the insert respectively. The clamp 26 does not engage the entire upper face of the insert 11, but engages the chip groove which is not in use, so that the part of the clamp 26 engaging the insert 11 is below the upper surface of the insert 11. The clamp can, however, engage the top surface of the insert 11, and the invention may be applied to other shapes of insert.

Having thus described my invention, what I claim as new and desire to secure by Letters Patent is:

1. A tool holder comprising in combination a shank having at one end thereof a recess adapted to receive a cutting insert, the recess defining a shoulder with the remainder of the shank, a first clamping member engageable with an insert positioned in said recess and movable transversely relative to the shank to clamp the insert against the base of said recess, a screw extending through the first clamping member into screw threaded engagement with shank so that rotation of the screw moves the first clamping member transversely relative to the shank, a second clamping member engageable with the insert and movable longitudinally relative to the shank to clamp the insert against said shoulder, and co-operating cam surfaces on the first and second clamping members, movement of the first clamping member transversely relative to the shank to clamp the insert against the base of said recess acting through said cam surfaces to move the second clamping member longitudinally relative to the shank to clamp the insert against said shoulder.

2. A toolholder as claimed in claim 1 in which the shoulder is shaped complementarily to a pair of adjacent sides of the insert to be used in the toolholder.

3. A toolholder as claimed in claim 1 including a spring urging the first clamping member away from the insert.

4. A toolholder as claimed in claim 1 including a passage beneath said recess, said second clamping member sliding within said passage and having a part extending into said recess to engage a cutting insert.

5. A toolholder as claimed in claim 4 including a spring urging the second clamping member to a position to move the insert away from the shoulder.

References Cited

UNITED STATES PATENTS

| 3,084,416 | 4/1963 | Broughton | 29—96 |
| 3,137,059 | 6/1964 | Hertel | 29—96 |
| 3,154,974 | 11/1964 | Greenleaf | 29—96 |
| 3,226,797 | 1/1966 | Hertel | 29—96 |
| 3,238,600 | 3/1966 | Milewski | 29—96 |
| 3,289,272 | 12/1966 | Stier | 29—96 |

HARRISON L. HINSON, *Primary Examiner.*